United States Patent Office 3,755,556
Patented Aug. 28, 1973

3,755,556
LOW TEMPERATURE SHIFT REACTION INVOLVING AN ALKALI METAL COMPOUND AND A HYDROGENATION-DEHYDROGENATION COMPONENT
Clyde L. Aldridge, Baton Rouge, La., assignor to Esso Research and Engineering Company
No Drawing. Filed July 7, 1970, Ser. No. 52,997
Int. Cl. C01b *1/05, 1/08*
U.S. Cl. 423—655                          17 Claims

ABSTRACT OF THE DISCLOSURE

A process for producing hydrogen comprising reacting carbon monoxide with steam at a temperature of at least 300° F. in the presence of (1) at least one alkali metal compound derived from acids having ionization constants below $1 \times 10^{-3}$ and (2) rhenium. The ratio of the rhenium component to the alkali metal compound ranges from 0.001 to about 10 parts by weight of the alkali metal compound. The alkali metal compound may be impregnated on the hydrogenation-dehydrogenation component, Re, or may be mixed with or used in the presence of said component. A suitable combination is a potassium compound such as potassium carbonate mixed with $Re_2O_7$ on an alumina support.

BACKGROUND OF THE INVENTION

Field of the invention

This invention relates generally to a process for producing hydrogen by reacting carbon monoxide with steam at elevated temperatures in the presence of at least one alkali metal compound and an oxide or sulfide of rhenium. More particularly, the invention relates to a process for producing hydrogen by reacting carbon monoxide with steam at a temperature of at least 300° F. in the presence of an alkali metal compound derived from an acid having an ionization constant less than $1 \times 10^{-3}$ with a hydrogenation-dehydrogenation component comprising rhenium.

Description of the prior art

The present invention relates to the preparation of hydrogen from carbonaceous materials in accordance with the equations $$C + H_2O \rightleftharpoons CO + H_2$$
$$CO + H_2O \rightleftharpoons CO_2 + H_2$$

It is well known to prepare hydrogen by reacting carbonaceous materials, such as hydrocarbons with steam at elevated temperatures of 1200°–1400° F. or coal or coke with steam at temperatures up to 2500° F. and then to react the resulting mixture of CO and $H_2$ with more steam at lower temperatures, for example at 800°–900° F. in the presence of suitable catalysts to convert the carbon monoxide produced in the first stage to carbon dioxide and additional hydrogen. The second step, known as the water gas shift reaction, is limited by equilibrium considerations and complete conversion of CO to $CO_2$ is not realized. However, the concentration of CO in the product when equilibrium is reached is highly dependent on the temperature. Consequently conversions can be increased by either removing the carbon dioxide and again contacting the CO and steam with the catalyst in the same or subsequent stages or by lowering the temperature.

The effect of temperature on the equilibrium constant $$K = \frac{(CO_2)(H_2)}{(CO)(H_2O)}$$

is shown in the following table:

| Temperature, ° F.: | K | Concentration of CO at equilibrium (dry basis) feed* | |
|---|---|---|---|
| | | A | B |
| 900 | 5.61 | | |
| 800 | 9.03 | 5.19 | |
| 700 | 15.89 | 3.30 | 1.12 |
| 600 | 31.44 | 1.77 | 0.56 |
| 500 | 72.75 | | |
| 400 | 206.8 | 0.29 | |

*A—50% of a 1/1 $H_2$/CO mixture plus 50% $H_2O$ (steam); B—30% of a 1/1 $H_2$/CO mixture plus 70% $H_2O$ (steam).

It is thus evident that less CO will remain unconverted and costly methods of operation will be avoided by operating at as low temperatures as possible, e.g., 300–700° F., preferably 400–600° F. Such low temperatures can be employed by the use of a catalyst consisting of copper deposited on zinc oxide. Unfortunately, however, this catalyst will not tolerate even traces of sulfur in the feed. Since coal and coke and heavy hydrocarbon feeds suitable for conversion to hydrogen contain appreciable amounts of sulfur, e.g., up to 5 to 10 wt. percent which is converted to hydrogen sulfide and even some small amounts of carbon disulfide and carbonyl sulfide, these feeds are precluded from use with the Cu-ZnO catalyst, and are limited to shift temperatures of 750°–900° F. using a sulfur resistant catalyst such as $Fe_2O_3$ promoted with $Cr_2O_3$. It is also known to use $K_2CO_3$ deposited on activated carbon as a low temperature catalyst (see Erdol u. Kohle V. 6:195 (1953) and V. 9:19 (1956)).

In copending application, Ser. No. 715,948, filed Mar. 26, 1968, for Clyde L. Aldridge, now U.S. 3,615,216, it is shown that cesium salts derived from acids having ionization constants of less than $1 \times 10^{-3}$ on high surface area supports, such as cesium carbonate on activated carbon, give improved results at temperatures of 400 to 700° F. and that these catalysts, though somewhat affected by sulfur, nevertheless are sufficiently sulfur resistant so that acceptable conversion of CO to $CO_2$ can be obtained.

SUMMARY OF THE INVENTION

It has now been found that gas mixtures containing carbon monoxide contaminated with relatively large amounts of sulfur can be converted to hydrogen economically by reaction with steam at a temperature of at least 300° F. in the presence of (1) at least one alkali metal compound, said compound being derived from an acid having an ionization constant less than about $1 \times 10^{-3}$, and (2) a hydrogenation-dehydrogenation component. The alkali metal compound and the hydrogenation-dehydrogenation component may be supported on a carrier together or separately. In addition, the alkali metal compound may be impregnated on the hydrogenation-dehydrogenation component. A particularly suitable hydrogenation-dehydrogenation component is rhenium, which is usually present as a sulfide or oxide, e.g., $Re_2O_7$. These catalysts have especially good activity if they are sulfided prior to use, and thus are particularly suitable for use with feeds containing sulfur. However, these catalyst compositions may also be used with sulfur-free feeds.

When sulfur-containing feeds are used the catalyst may be sulfided in situ by passing the feed over the oxide or other compound which is then converted to the sulfide. The ratio of the rhenium component to the alkali metal compound is from about 0.001 to about 10 parts by weight of the alkali metal compound.

PREFERRED EMBODIMENTS

The first stage reaction in the preparation of hydrogen comprises reacting coal, coke, or heavy feeds at 1000–2500° F. with steam with or without the presence of hydrogen or the reaction of natural gas or other hydrocarbons with steam in the presence of reformer catalysts containing nickel, cobalt, etc. promoted with magnesia, alumina, thoria and similar oxides and supported if desired on an inert base at temperatures of 1200–1600° F. Hydrogen, carbon dioxide and carbon monoxide are obtained with a high ratio of CO to $CO_2$.

In accordance with the disclosures of the Aldridge application (supra) the second stage, or shift reaction, in which the carbon monoxide formed in the first stage is reacted with more steam at 300–700° F., preferably 400–600° F., is carried out in the presence of a cesium compound derived from an acid with a pKa less than $1 \times 10^{-3}$ supported on a carrier. It is also shown that these catalysts are affected to some extent by sulfur but that they are sufficiently resistant to sulfur so that acceptable conversion of CO to $CO_2$ can be obtained.

The present invention makes it possible not only to overcome the effect of sulfur on the alkali metal compounds but also enables substantially complete conversion of carbon monoxide to carbon dioxide to be achieved in one step at low temperatures, an accomplishment which has heretofore been impossible in the presence of sulfur. These results are obtained in accordance with the present invention by carrying out the reaction in the additional presence of 0.001 to 5 parts by weight of a hydrogenation-dehydrogenation catalyst component per weight of alkali metal without reference to any support which may be used. The use of these catalysts in conjunction with the alkali metal salt enables more complete conversion of the carbon monoxide to carbon dioxide even in the presence of sulfur and thus affords vast economic savings since a costly step of removing the carbon dioxide is avoided. While it is not intended to be limited by any theory concerning the mechanism of the reaction, it is believed that the alkali metal component in the presence of water vapor exists as a liquid phase in contact with the surface of the hydrogenation-dehydrogenation component. It is believed that the aqueous alkali metal phase converts the carbon monoxide to formate and the hydrogenation-dehydrogenation catalyst surface converts the formate into $CO_2$ and $H_2$. Thus the interaction between the two types of catalysts brings about a vast synergistic effect on catalytic activity.

Suitable alkali metal components include the carbonate, bicarbonate, biphosphate, sulfide, hydrosulfide, silicate, bisulfite, aluminate, hydroxide, acetate, tungstate, etc. of sodium, potassium, lithium, rubidium and cesium. In addition the alkali metal salts of organic acids such as acetate and are equally suitable. Actually the alkali salt of any acid which has an ionization constant of less than $1 \times 10^{-3}$ may be used. The potassium and cesium salts are most preferred.

The hydrogenation-dehydrogenation component of the catalyst comprises an oxide or sulfide of rhenium. Suitable rhenium compounds are $Re_2O_7$, $Re_2S_7$, as well as other rhenium oxides and sulfides.

If the rhenium metal is used with sulfur-containing feeds, it may be used in the form of the oxide or other compound easily sulfided. These compounds are then sulfided in situ by passing the sulfur-containing feed over them. Cesium or potassium carbonate or acetate combined with $Re_2O_7$ is a particularly effective catalyst. Hereinafter these catalysts will be referred to as the metal without reference to how it is combined since the actual composition prior to the shift reaction is, for example, $Re_2O_7$ or other oxide. Under the reaction conditions the catalyst usually exists in a partially reduced and sulfided state which is difficult to define stoichiometrically and thus a description using the active metallic elements is as accurate as any.

The catalytically active metal component may be used either supported or unsupported and in the former case the nature of the carrier is not critical. Suitable carriers include alumina having an extremely broad range of surface area, such as gamma and alpha aluminas. Other suitable support materials include silica, silica-alumina, e.g., silica-alumina cogel cracking catalysts; zeolites such as faujasite, erionite, and the like; activated carbon, coconut charcoal, Columbia L carbon, magnesia, titania, zirconia and the like. Particularly suitable gamma and alpha-alumina catalyst supports are available commercially. Such supports may be prepared by a variety of methods. For example, they may be prepared by hydrolyzing an alumina alcoholate which may have been prepared in accordance with the disclosures of U.S. Pat. 2,636,865. They may also be prepared by precipitating a hydrous alumina from an aqueous solution of an aluminum salt, preferably $AlCl_3$. A third method of preparation comprises dissolving metallic aluminum in weakly acidified water, preferably acidified with an organic acid, such as acetic acid, in the presence of mercury or compound thereof, and thereafter gelling the alumina sol thus formed. The hydrous alumina prepared by any of the foregoing procedures is subsequently dried and calcined at temperatures between 600 and 1200° F., preferably between 900 and 1000° F.

The catalyst components can be incorporated on the support in any conventional manner. Preferably the hydrogenation-dehydrogenation component is placed on the support first and is then calcined, e.g., at 600–1200° F., to convert the metal to the stable oxide form. Then the alkali metal, e.g., cesium or potassium carbonate, is impregnated onto the support and the catalyst simply dried. In general the carrier material is impregnated with a solution containing the desired compound. The finished catalyst is then sulfided in a known manner, e.g., by passing over the catalyst a mixture of hydrogen and hydrogen sulfide, carbon disulfide, butyl mercaptan and the like. However, it may be sulfided in situ as described above.

Alternatively the various components may be mixed by mechanical means, such as by dry mixing. Good catalysts can be obtained by fine milling of a rhenium catalyst supported on alumina and mixing the powder obtained with a powdered alkali metal compound such as cesium carbonate. The resultant mixture, after the addition of a lubricant such as stearic acid or graphite, is compressed into pellets which can be calcined and sulfided.

The hydrogenation-dehydrogenation component is used in amounts varying from about 0.001 to about 10 parts by weight based on the alkali metal compound, preferably from about 0.01 to about 5.0 parts by weight and most preferably from 0.1 to 3.0 parts by weight, exclusive of any carrier which might be used to support either or both components. All components are calculated on the basis of the oxide thereof.

When a carrier is used the ratio of catalyst components to carrier is not critical but may range from about 90 wt. percent to about 0.5 wt. percent, however, it has been found most desirable to use amounts of from about 50 to about 1 wt. percent, all based on total catalyst including the carrier. A hydrogenation-dehydrogenation catalyst which has been found particularly effective contains from about 0.01 to about 5 wt. percent rhenium oxide on a gamma alumina, prior to sulfiding. This catalyst component can be impregnated with about 5 to about 80 wt. percent of alkali metal compound and sulfided to make the final catalyst. Alternatively, the alkali metal compound may be itself supported independently of the hydrogenation-dehydrogenation component, both of which may be mixed together and then sulfided to make the catalyst composition.

The process is preferably carried out continuously. The gaseous hourly space velocity can vary within wide limits. Gaseous hourly space velocities between 300 and 30,000 volumes of feed per volume of supported catalyst per hour (v./v. hr.) measured on the basis of dry gas under standard conditions are particularly suitable for most applications. The process may be carried out at higher gaseous hourly space velocities if desired.

Referring now more specifically to the shift process, except for the low temperature, with its favorable effect on reaction equilibrium, resulting from the practice of this invention, water gas shift reactions are well known. Carbon monoxide or a gas containing 0.1% or more carbon monoxide by volume, and steam in an amount of 1–100 volumes per volume of carbon monoxide, are introduced into a shift converter and passed over the alkali metal and hydrogenation-dehydrogenation catalyst at a temperature between 300 and 700° F. The pressure is preferably in the range of 200 to 1500 pounds per square inch gauge (p.s.i.g.), although it may vary from atmospheric to 3,000 p.s.i.g. or more. However, the exact pressure and temperature conditions must be maintained above the dew point of the steam in the mixture. The process is particularly effective when the feed contains sulfur. In fact the presence of sulfur in the feed actually results in increased conversions in many cases. If necessary the catalyst may be regenerated by oxidation and resulfiding.

Typical results of operations in accordance with the process of this invention are given in the following examples. It will be evident that the examples are merely illustrative of the invention and no undue limitation is imposed thereby. In all cases herein the analyses of the hydrogenation-dehydrogenation component are calculated on the basis of the metal expressed as the oxide and the alkali metal component expressed as the oxide.

EXAMPLE 1

A solution of 3.62 g. of ammonium perrhenate (69.4% Re) in 20 cc. of water was impregnated onto 30.0 g. of 20–40 mesh high surface area $\gamma Al_2O_3$ and the mixture dried in an oven at 130° C. This impregnation and drying was repeated one time after which the solid was calcined overnight at 1000° F. The recovered solid weighing 35.72 g. was then impregnated with an aqueous solution of 10.59 g. $Cs_2CO_3$ and dried to yield 46.52 g. of finished catalyst "A." See Table 1.

EXAMPLE 2

A solution of 0.72 g. of ammonium perrhenate (69.4% Re) in 20 cc. of water was impregnated onto 30.0 g. of 20–40 mesh high surface area $\gamma Al_2O_3$ and the mixture dried in and oven at 120° C. The solid was calcined overnight at 1000° F. The recovered solid weighing 29.86 g. was then impregnated with an aqueous solution of 10.45 g. cesium carbonate and dried to yield 40.75 g. of finished catalyst "B." See Table 1.

EXAMPLE 3

Catalysts A and B were tested in the following manner (with results shown in Table 1):

A gas mixture comprising 43% hydrogen, 56% CO and 1% $H_2S$, together with an equal volume of steam, was passed over each catalyst in a suitable reaction vessel, at such a rate to yield 2700 v./v./hr. (at standard conditions) of dry product gas. Results, as a function of temperature, are tabulated below.

TABLE 1.—WATER GAS SHIFT REACTIONS

| Catalyst components: | | | Reaction conditions | | Residual CO in dry product gas | |
|---|---|---|---|---|---|---|
| | | | Temp., °F. | Pressure, p.s.i.g. | | |
| Alkali metal | 1.7×10⁻³ g. atom cesium/cc. cat. vol. | | | | | |
| Hydrogenation component | Catalyst A | Catalyst B | None | | | |
| Metal | 18.26% $Re_2O_7$ | 2.05% $Re_2O_7$ | | 625 | 550 | 1.23 | 1.20 | 48.61 |
| Support | $\gamma$ alumina | | | 550 | 550 | | 3.10 | |
| | | | | 525 | 550 | 4.24 | 6.63 | |

What is claimed is:

1. A process for producing hydrogen and carbon dioxide which comprises reacting carbon monoxide with from 1 to 100 volumes of steam per volume of carbon monoxide at a temperature above the dew point temperature of the steam in the reaction mixture and ranging from about 300° to 700° F. and at a pressure below the dew point pressure of the steam in the reaction mixture and ranging from about atmospheric to about 3000 p.s.i.g. in the presence of a catalyst comprising (1) at least one alkali metal compound, said compound being derived from an acid having an ionization constant of less than about $1 \times 10^{-3}$ and (2) a hydrogenation-dehydrogenation component comprising rhenium, the weight ratio of said rhenium component to said alkali metal compound, both calculated on the basis of the oxides thereof, being in the range of from about 0.001 to 10.

2. The process of claim 1 wherein said catalyst is contained on a support.

3. The process of claim 1 wherein said weight ratio of rhenium component to alkali metal component, both calculated on the basis of the oxides thereof, is in the range of about 0.001 to 5.

4. The process of claim 1 in which the alkli metal compound or hydrogenation-dehydrogenation component is in a sulfide form.

5. The process of claim 1, in which the alkali metal compound is cesium carbonate.

6. The process of claim 1 in which the alkali metal compound is potassium carbonate.

7. The process of claim 1 in which the alkali metal component is potassium sulfide.

8. The process of claim 1 in which the alkali metal compound is potassium acetate.

9. The process of claim 1 in which the alkali metal compound is present with a sulfide of rhenium.

10. The process of claim 4 wherein said catalyst is contained on a support.

11. A process for producing hydrogen and carbon dioxide which comprises reacting carbon monoxide present in a gas mixture having at least 0.1% by volume carbon monoxide and containing sulfur contaminants with from 1 to 100 volumes of steam per volume of carbon monoxide at a temperature above the dew point temperature of the steam in the reaction mixture and ranging from about 300° to 700° F. and at a pressure below the dew point pressure of the steam in the reaction mixture and ranging from about atmospheric to about 3000 p.s.i.g., in the presence of a catalyst comprising (1) at least one alkali metal compound, said compound being derived from an acid having an ionization constant of less than about $1 \times 10^{-3}$ and (2) a hydrogenation-dehydrogenation component comprising a sulfide of rhenium, said catalyst contained on a support and the weight ratio of the rhenium component to the alkali metal compound, both calculated on the basis of the oxides thereof, being in the range of from about 0.001 to 5.

12. The process of claim 11 wherein said alkali metal compound is an alkali metal carbonate.

13. The process of claim 11 wherein said support is alumina.

14. The process of claim 11 wherein said alkali metal compound is potassium carbonate or cesium carbonate.

15. The process of claim 13 wherein said alkali metal compound is potassium carbonate or cesium carbonate.

16. The process of claim 1 wherein said carbon monoxide is present in a gas mixture having at least 0.1% by volume carbon monoxide and containing sulfur contaminants.

17. The process of claim 9 wherein said catalyst is contained on a support.

References Cited

UNITED STATES PATENTS

| | | | |
|---|---|---|---|
| 3,615,216 | 10/1971 | Aldridge | 23—213 |
| 3,449,078 | 6/1969 | Quik et al. | 23—213 X |
| 3,539,297 | 11/1970 | Aldridge | 23—213 |
| 3,392,001 | 7/1968 | Lorenz et al. | 23—213 |
| 3,380,934 | 4/1968 | Butzold | 252—476 |

FOREIGN PATENTS

| | | | |
|---|---|---|---|
| 594,285 | 3/1960 | Canada | 23—213 |
| 1,490,005 | 7/1967 | France | 23—213 |

EDWARD STERN, Primary Examiner

U.S. Cl. X.R.

423—656; 252—373, 476